United States Patent [19]

Holmes

[11] Patent Number: 4,915,079
[45] Date of Patent: Apr. 10, 1990

[54] ADAPTIVE CONTROL SYSTEM FOR AN INTERNAL COMBUSTION ENGINE AND METHOD OF OPERATING AN INTERNAL COMBUSTION ENGINE

[75] Inventor: Michael Holmes, Solihull, Great Britain

[73] Assignee: Lucas Industries public limited company, Birmingham, England

[21] Appl. No.: 347,116

[22] Filed: May 1, 1989

[30] Foreign Application Priority Data

May 7, 1988 [GB] United Kingdom ................. 8810878

[51] Int. Cl.$^4$ .............................................. F02P 5/15
[52] U.S. Cl. .................................... 123/419; 123/436; 364/431.08
[58] Field of Search ............... 123/417, 419, 436, 478, 123/480; 364/431.05, 431.08

[56] References Cited

U.S. PATENT DOCUMENTS

| | | | |
|---|---|---|---|
| 4,448,162 | 5/1984 | Ninomiya et al. | 123/419 |
| 4,467,765 | 8/1984 | Suzuki et al. | 123/419 |
| 4,478,185 | 10/1984 | Obayashi et al. | 123/419 |
| 4,502,442 | 3/1985 | Takakuwa et al. | 123/419 X |
| 4,509,477 | 4/1985 | Takao et al. | 123/419 X |
| 4,799,469 | 1/1989 | Nagano et al. | 123/419 X |
| 4,841,933 | 6/1989 | McHale et al. | 123/419 |

Primary Examiner—Willis R. Wolfe
Attorney, Agent, or Firm—Nixon & Vanderhye

[57] ABSTRACT

An adaptive control system for an internal combustion engine has a mixture control device and an ignition timing control device. Combustion performance, such as engine roughness is measured and mixture varied about a base value to achieve a desired performance. Ignition timing is compensated for the mixture variation by perturbing ignition timing about a base valve, detecting the slope of engine output with respect to ignition timing and varying the timing to achieve a desired slope.

21 Claims, 13 Drawing Sheets

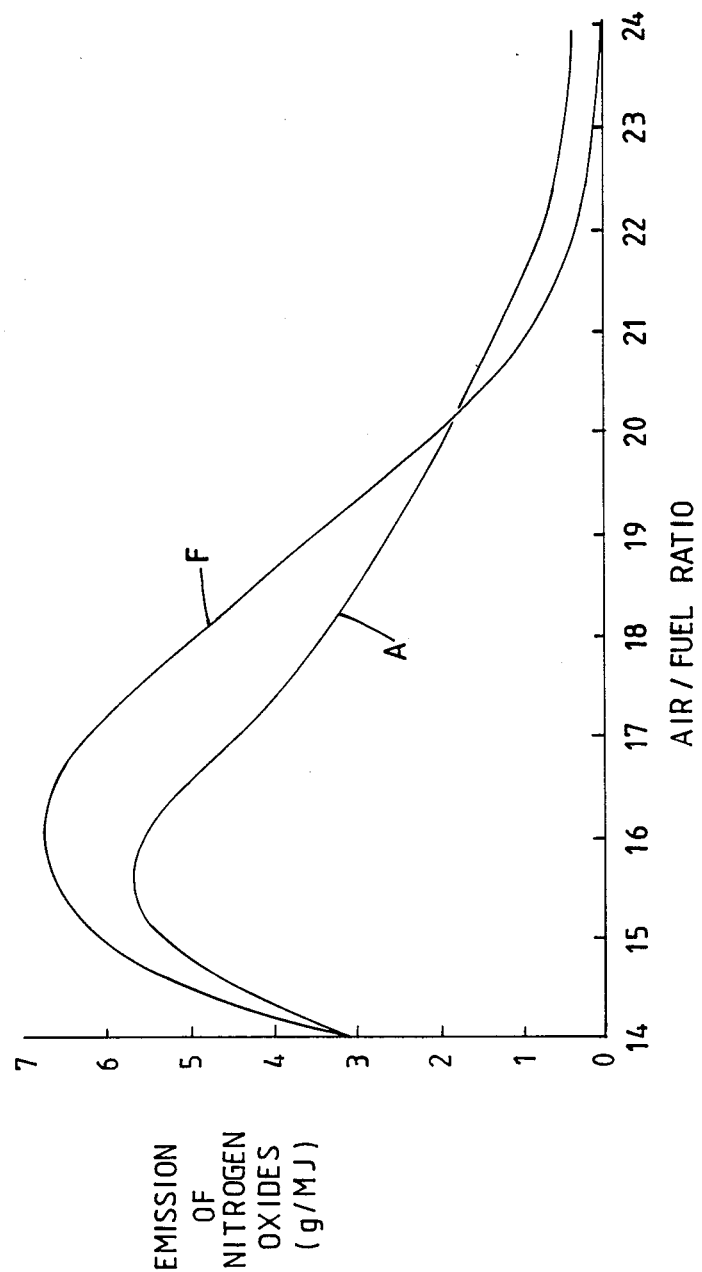

ADAPTIVE CONTROL SYSTEM FOR AN INTERNAL COMBUSTION ENGINE AND METHOD OF OPERATING AN INTERNAL COMBUSTION ENGINE

This invention relates to an adaptive control system for an internal combustion engine and further relates to a method of operating an internal combustion engine.

In view of the increasing stringency of emission control regulations in various countries in recent years, many attempts have been made to improve fuel supply systems of engines to reduce production of pollutants while maintaining good engine driveability. Pollutants include nitrogen oxides, carbon monoxide, and unburnt hydrocarbons.

In one approach to reduce production of pollutants, the fuel and air are supplied to the cylinders in stoichiometric proportions and the pollutants are removed by using a catalyst. This approach suffers from the disadvantages that the catalyst is liable to deteriorate with use and running an engine with a stoichiometric mixture results in a relatively high fuel consumption.

In another approach, known as the "lean-burn approach", a mixture containing excess air is supplied to the cylinders. Production of pollutants in the form of carbon monoxide, nitrogen oxide and hydrocarbons is much less than with the stoichiometric approach. An arrangement using this approach is less prone to deterioration with time than an arrangement using the stoichiometric approach and the lean-burn approach results in an improvement in fuel consumption in comparison with the stoichiometric approach.

The production of both hydrocarbons and carbon monoxide reduces progressively as the amount of excess air in the mixture is increased until a lean burn limit is attained.

As the excess air is increased beyond the lean burn limit, the hydrocarbons present in the exhaust start to increase while the carbon monoxide continues to decrease. The increase in hydrocarbons is caused by partial burn of the mixture and/or misfire. Misfire is defined as failure of ignition of the mixture, whereas partial burn is a phenomenon in which the mixture is excessively slow burning. Partial burn and misfire occur randomly causing torque fluctuations or roughness.

The formation of nitrogen oxides is associated with high temperatures within the combustion chambers. The highest temperatures occur with mixtures whose composition is close to stoichiometric. Under these conditions, there is little free oxygen to participate in the formation of nitrogen oxides. The rate of formation of nitrogen oxides is greatest with fuel mixtures containing some excess air. Formation of nitrogen oxides is reduced if the peak temperature during combustion is reduced by diluting the mixture either with excess air or with exhaust gas or by water injection. The temperature may also be reduced by reducing the compression ratio or retarding ignition timing but these approaches lead to increased fuel consumption. Consequently it is desirable to reduce nitrogen oxides by running with a lean mixture.

However, as mentioned earlier, as excess air is introduced and nitrogen oxides reduce, hydrocarbons and roughness start to increase. Therefore, there is an air to fuel ratio range or window within which a desired combustion performance occurs.

From engine to engine this air to fuel ratio will vary and so it is desirable to have a feedback parameter to measure the combustion performance to enable the engine to operate in a consistent manner.

In a combustion chamber, flame propagation after ignition occurs at a finite speed. It has been found that maximum efficiency occurs when the peak pressures are generated approximately 5°–15° after a piston has passed its top dead centre position. In order to achieve this, ignition occurs before the piston reaches top dead centre.

As the composition of the mixture supplied to the combustion chambers is made progressively leaner, flame speed falls and ignition must be advanced progressively to compensate for this. With very lean mixtures, or with high levels of exhaust gas recirculation, the flame speed becomes low and the ignition timing must be very advanced. Consequently, the temperatures and pressures of the mixture at the moment of ignition are low and flame propagation is also low. Under these conditions, small variations in mixture composition and turbulence can lead to large variations in the time required to burn the mixture. If the ignition timing is not compensated to cater for these variations in burn rates, a poor combustion performance will occur.

Various parameters may be used to define combustion performance. As mentioned in the preceding paragraph, with very lean mixtures, combustion performance is poor and variations in cylinder pressure from cycle to cycle cause engine roughness. Consequently, a parameter indicative of such variations will also be indicative of both engine roughness and combustion performance.

Variations in cylinder pressure cause variations in output torque, and hence output speed and so a parameter indicative of either the variations in engine torque or engine speed may be used to indicate both roughness and combustion performance.

Combustion performance may also be indicated by the pollutants in the exhaust. As has been mentioned earlier, hydrocarbons decrease as the lean burn limit is approached and then start to increase again beyond the lean burn limit. Consequently hydrocarbon emission sensors are capable of detecting this transition and hence in defining a window within which the desired combustion performance is required. Because the level of nitrogen oxides progressively decreases as excess air is introduced into the mixture, it is possible to indicate desired combustion performance as an absolute level of nitrogen oxides reaches a predetermined value. Carbon monoxide levels follow a similar pattern to that of nitrogen oxides, and so a carbon monoxide detector could be used to operate in a similar manner. However, the predetermined value at which the nitrogen oxides content of the exhaust suitably represents desired combustion performance normally ensures that carbon monoxide presence is insignificant.

Suitable hydrocarbon and nitrogen oxides sensors are not at present available for installation on road vehicles and such measurements may be inferred by other means such as parameters which themselves are indicative of flame speed, flame intensity or flame colour or variations in flame speed, intensity or colour from cycle to cycle.

Consequently, it is necessary to control the mixture composition between a fast burning limit beyond which the generation of pollutants exceeds a desirable level and a slow burning limit beyond which engine roughness becomes unacceptable or beyond which there is a danger of misfires occurring. In practice, as mentioned earlier, there is a narrow window for an acceptable mixture composition between the fast and slow burning limits for each engine within which desired combustion performance occurs.

Modern systems for controlling ignition timing and mixture composition in an internal combustion engine make use of schedules stored in read-only-memory. These schedules contain data specifying desired ignition timing and mixture composition values for a multiplicity of combinations of values of two different engine operating parameters, such as engine speed and a parameter indicative of the load demand to which the engine is subjected. The schedules represent very complex surfaces which are unobtainable using mechanical cams or simple electronic function generators and they provide a great improvement over the earlier arrangements. However, they do not provide a completely adequate answer to controlling the production of pollutants and to engine efficiency as there are many variables which cannot be taken into account. Such variables include fuel composition and volatility, the effects of deposits on the engine cylinder head which in turn affect flame speed, changes in the accuracy of the operation of the equipment which controls fuel mixture, variations in ignition energy and spark gap, variations between engines of the same type and changes in ambient pressure and temperature.

Various closed loop systems have been proposed to overcome these variable factors.

One such closed loop system uses an exhaust gas oxygen sensor. This system can compensate for variations in fuel composition or for variations in the air to fuel ratio in the mixture. However, it cannot compensate for variations in some other factors, such as variations in compression ratio or, where exhaust gas circulation is provided, for variations in the amount of exhaust gas which is recirculated.

In another system, an optical sensor is mounted inside the cylinder and used to sense either flame intensity or flame colour and the air to fuel ratio is then adjusted so as to obtain either a desired flame intensity or flame colour.

In another system, engine roughness is used as a parameter for controlling the air to fuel ratio. Such a system is described in SAE paper 860413, entitled "Lean Limit A/F Control System by using Engine Speed Variation", by T. Ina, H. Obayashi, and T. Shigematsu.

These last two systems provide compensation for variation in the various factors which affect combustion performance and both of these systems are capable of achieving an air to fuel ratio suited to the requirements of a particular engine. However, as the air to fuel ratio is varied, it becomes necessary to provide an appropriate compensation to the ignition timing and neither of the systems provides such compensation.

In U.S. Pat. No. 3,142,967, there is described a system in which both ignition timing and air to fuel ratio are optimised to provide maximum fuel economy. In order to optimise the air to fuel ratio and the ignition timing, these two parameters are alternately oscillated about base values and the resulting changes in engine torque are measured by deriving engine acceleration from speed sensing. The changes in torque are then used to optimise the two parameters. The system suffers from the disadvantage that the air to fuel ratio at which maximum fuel economy occurs may not coincide with the air to fuel ratio at which the production of pollutants is minimised. Also, the system described in this patent is of a complicated construction in that it is necessary to provide oscillations to both the air to fuel ratio and the ignition timing.

It is an object of this invention to provide a new or improved system for controlling an internal combustion engine and also a new or improved method of operating such an engine in which the above mentioned disadvantages are overcome or reduced.

According to one aspect of this invention, there is provided an adaptive control system for an internal combustion engine comprising a mixture composition control device having a first control input, an ignition timing control device having a second control input, means for measuring a parameter indicative of the combustion performance occurring in the combustion chambers of the engine, means for applying a variation to the first input so as to achieve a desired value of the combustion performance parameter, and means for compensating the second control input for the variation applied to the first control input.

By applying a variation to the first control input so as to achieve a desired value of the combustion performance parameter, a mixture composition may be achieved at which the production of pollutants is as low as possible without causing excessive engine roughness.

By compensating the second control input for the variation applied to the first control input, the applicants have found that the production of pollutants may be reduced, and the efficiency of the engine may be increased, in comparison with an arrangement where no such compensation is provided.

Although varying the first control input and compensating the second control input will normally be performed in an alternating sequence, there may be situations where it is possible or even preferable to perform the variation and compensation simultaneously.

The desired value of the combustion performance parameter may be established continuously in accordance with the engine operating conditions.

The system may include means for establishing a base value for the first control input in accordance with engine operating conditions, and means for establishing a base value for the second control input in accordance with engine operating conditions, said means for applying a variation to the first control input being arranged to apply said variation with respect to its base value and said means for compensating the second control input being arranged to compensate the second control input with respect to its base value.

The combustion performance parameter may be a parameter indicative of engine roughness.

The mixture composition control device may be a device for controlling the air to fuel ratio of the mixture supplied to the combustion chambers of the engine. Alternatively, in an engine in which exhaust gas is recirculated to the combustion chambers, the mixture composition control device may be arranged to control the ratio of exhaust gas to air in the mixture of air and fuel supplied to the combustion chambers.

The compensating means may comprise means for determining the slope of a parameter indicative of engine output with respect to ignition timing, and means for varying the second control input so as to achieve a desired value of the slope.

Said desired value may be established in accordance with the engine operating conditions.

Said means for establishing said slope may be arranged to apply a perturbation to the second control input and to determine the slope from the resulting variation in the engine output parameter.

In the case of a spark ignition engine, the ignition control device may be a device for controlling the spark advance angle. In the case of a compression ignition engine, the ignition control device may be a device for controlling the timing of fuel injection.

The engine operating conditions may be engine speed and the load demand to which the engine is subjected.

According to another aspect of this invention, there is provided a method of controlling an internal combustion engine, said internal combustion engine having a mixture control device having a first control input and an ignition control device having a second control input, said method comprising the steps of measuring a parameter indicative of the combustion performance occurring in the combustion chambers of the engine, applying a variation to the first control input so as to achieve a desired value of the combustion performance parameter, and compensating the second control input for the variation applied to the first control input.

This invention will now be described in more detail, by way of example, with reference to the drawings in which:

FIGS. 3a, 3b are graphs showing, respectively, the variations of emission of nitrogen oxides and emission of hydrocarbons with air to fuel ratio, each graph comprising two curves which respectively show the variation with a fixed value for the spark advance angle and with the value for spark advance angle optimised to achieve maximum engine output;

FIG. 9 (which comprises FIGS. 9a, 9b, 9c, and 9d) is a flow chart for the module SAFIRE.

Figure 2:
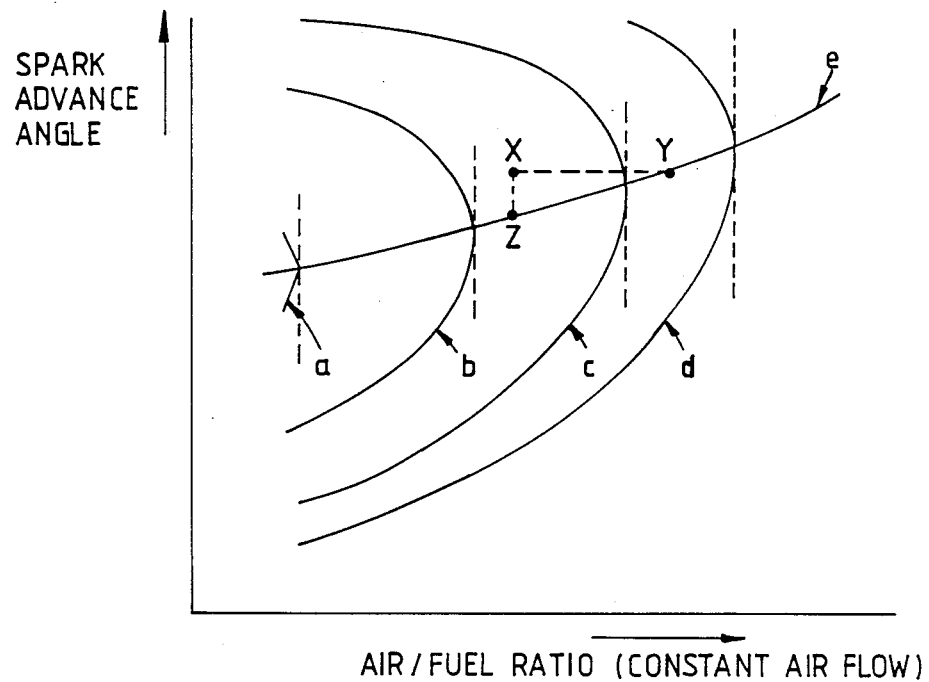
FIG. 2 is a graph in which the spark advance angle required to give particular levels of torque is plotted against air to fuel ratio.

Referring firstly to FIG. 2, there is shown a graph which is typical of graphs produced by the applicants in establishing values of spark advance angle and air to fuel ratio as a function of engine operating conditions. In FIG. 2, the four curves a, b, c, d indicate lines of constant torque plotted on axes representing air to fuel ratio and spark advance angle for constant values of engine speed and air flow. These curves may be obtained by running an engine on a test bench at a specific speed and air supply rate and measuring the torque obtained for different values of the spark advance angle and air to fuel ratio. In more detail, the engine is run with the air flow and spark advance angle set to specific values. The air to fuel ratio and braking load on the engine are then adjusted until a specific fuel flow and engine speed are obtained. The torque is then noted. For each one of a set of torque levels, points at which the particular torque level is obtained may be joined so as to provide the isotorque curves a, b, c, d.

At any point in FIG. 2, there is a vector which points in the direction which produces the maximum increase in the torque. Everywhere along an isotorque curve, the vector is at right angles to the curve since travel along the isotorque curve produces no change in torque. Hence points at which the isotorque curves are parallel to the spark advance angle axis are points at which there is no component of this vector in the spark advance angle direction. At these points, the partial differential or slope of torque with respect to spark advance angle is zero and these points have been joined by line e on FIG. 2. At each point not on line e, the slope of engine torque with respect to spark advance angle will have a non zero value.

At points anywhere in FIG. 2 above and to the left of line e, the slope of engine torque with respect to spark advance angle is negative. The area above and to the left of curve e in FIG. 2 represents air and fuel mixtures which burn too quickly for the actual spark advance angle to make the maximum contribution to the output of the engine. Below and to the right of line e, the slope is positive and this area below and to the right of curve e represents mixtures of fuel and air which do not have sufficient time to burn to make the maximum contribution for the actual spark advance angle.

For a particular type of engine, a set of graphs similar to that shown in FIG. 2 may be produced for a set of combinations of engine speed and air flow. While producing the graphs, emissions of pollutants and engine roughness may also be measured.

From the resulting set of graphs and measurements of emissions of pollutants and engine roughness, for each engine speed and air flow rate, an optimum combination of spark advance angle and air to fuel ratio may be selected. The air to fuel ratio may be selected so that the mixture is lean enough to prevent generation of pollutants, and in particular nitrogen oxides, but sufficiently rich to obtain efficient performance and avoid excessive engine roughness and hydrocarbon emissions. Normally, the spark advance angle is selected to be a point on curve e as such points correspond to maximum torque output for a particular air to fuel ratio. However, under certain conditions, a point away from curve e may be chosen. For example, during idling it may be desired to reduce the spark advance angle so as to reduce the emission of unburnt hydrocarbons. Each combination of the spark advance angle and air to fuel ratio will be associated with a particular value of engine roughness and also a particular value of the slope of engine torque with respect to spark advance angle.

When a particular engine is installed in a vehicle, the optimum air to fuel ratio varies from the values selected in accordance with the procedure discussed above. This variation is caused by various factors which include differences between individual engines of one type, changes which occur in an engine during ageing, changes in fuel composition and changes in ambient temperature in fuel composition and changes in ambient temperature and pressure. Thus, a value for the air to fuel ratio selected in accordance with the procedure discussed above may result in excessive engine roughness and/or excessive emissions of pollutants. Excessive emissions of pollutants and excessive roughness may be avoided and the air to fuel ratio restored to an optimum value by varying the air to fuel ratio so as to achieve an engine roughness equal to the value selected in accordance with the procedures discussed above for the prevailing engine speed and air flow rate.

Variation of the air to fuel ratio in this way will, in turn, cause a variation to the optimum value for the spark advance angle. For example, in order to maintain an engine operating on curve e in FIG. 2, the spark advance angle must be increased by approximately 3° for each unit increase in the air to fuel ratio. If the spark advance angle is compensated for the variation in the air to fuel ratio, and, specifically, if the spark advance angle is controlled so as to achieve maximum engine output, the applicants have found this gives the following result. The emissions of pollutants, and especially the emissions of nitrogen oxides and hydrocarbons, are more consistent than they are in the case where no such compensation is provided.

Figure 3B:
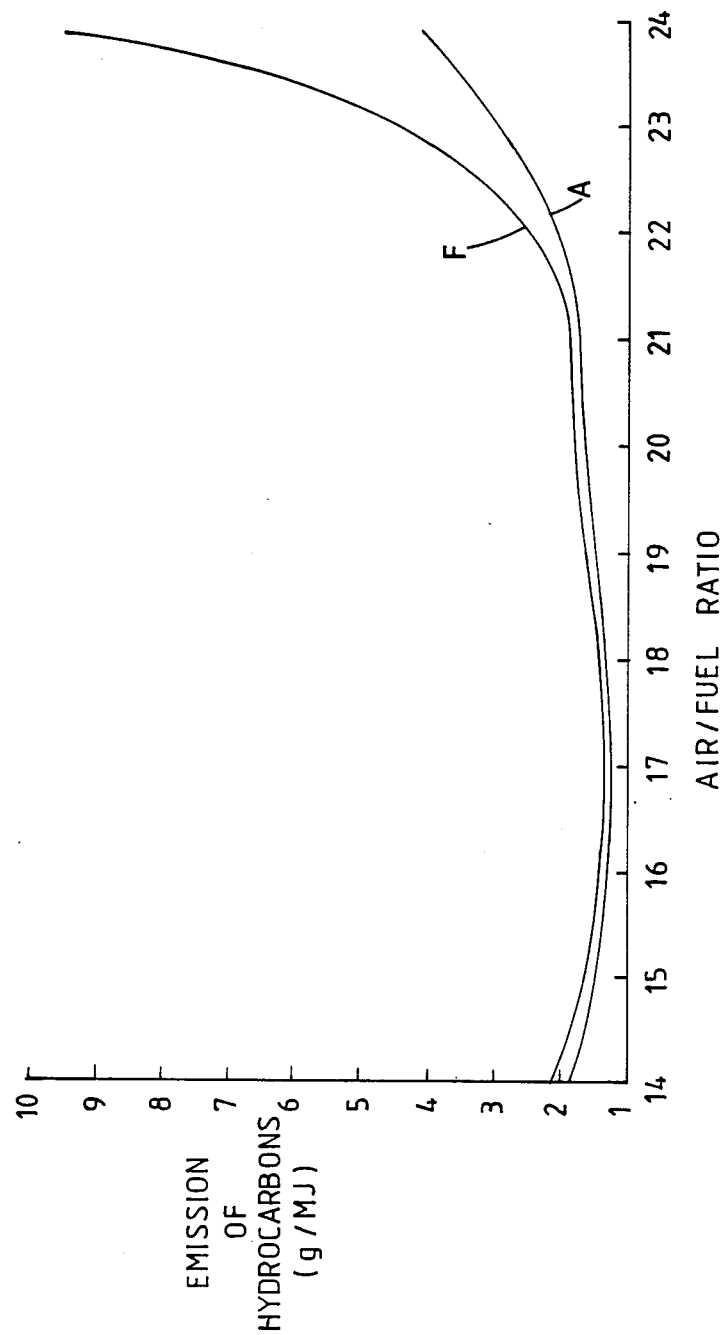

This is illustrated in FIGS. 3a and 3b which are graphs showing, respectively, variations in the emission of nitrogen oxides and emission of hydrocarbons as a function of air to fuel ratio (by weight). The units for the emissions of nitrogen oxides and hydrocarbons are grammes per megajoule of engine output. Each of these graphs comprises two curves labelled respectively F,A. The curves labelled F were obtained by using a fixed value for the spark advance angle, this value corresponding to the optimum torque at the nominal air to by varying the spark advance angle so as to achieve maximum torque under actual operating conditions.

From FIG. 3a, it may be seen that varying the spark advance angle causes a reduction in the emission of nitrogen oxides for richer mixtures but an increase for leaner mixtures does not cause a problem because the emission level is low for such mixtures. For the lean mixtures contemplated by the present invention, the emission of carbon monoxide is insignificant. From FIG. 3b it may be seen that, at the lean limit, advancing the spark timing causes the hydrocarbon emissions to reduce with respect to the curve in which the spark timing is not advanced, that is remains fixed. Between air/fuel ratios of about 15½ and 21, the curves A and F represent substantially the same levels of emissions of hydrocarbons. However, in FIG. 3b, the curves have been shown slightly separated for the sake of clarity.

There will now be described a control system, embodying the present invention, in which the air to fuel ratio and the spark advance angle are controlled respectively so as to achieve values of engine roughness and slope of engine output with respect to spark advance angle which have been selected for the prevailing engine operating conditions.

In the graph of FIG. 2, engine torque is used as a parameter to define engine output. Engine output can also be defined by engine speed or engine power and, in the example to be described below, engine speed is used as a parameter to define engine output.

In the graph of FIG. 2, air supply rate is used as a parameter to define the load demand to which the engine is subjected. Fuel flow, mixture flow, throttle angle or inlet manifold pressure can also be used to define load demand. In the example to be described below, manifold pressure is used.

Figure 1:
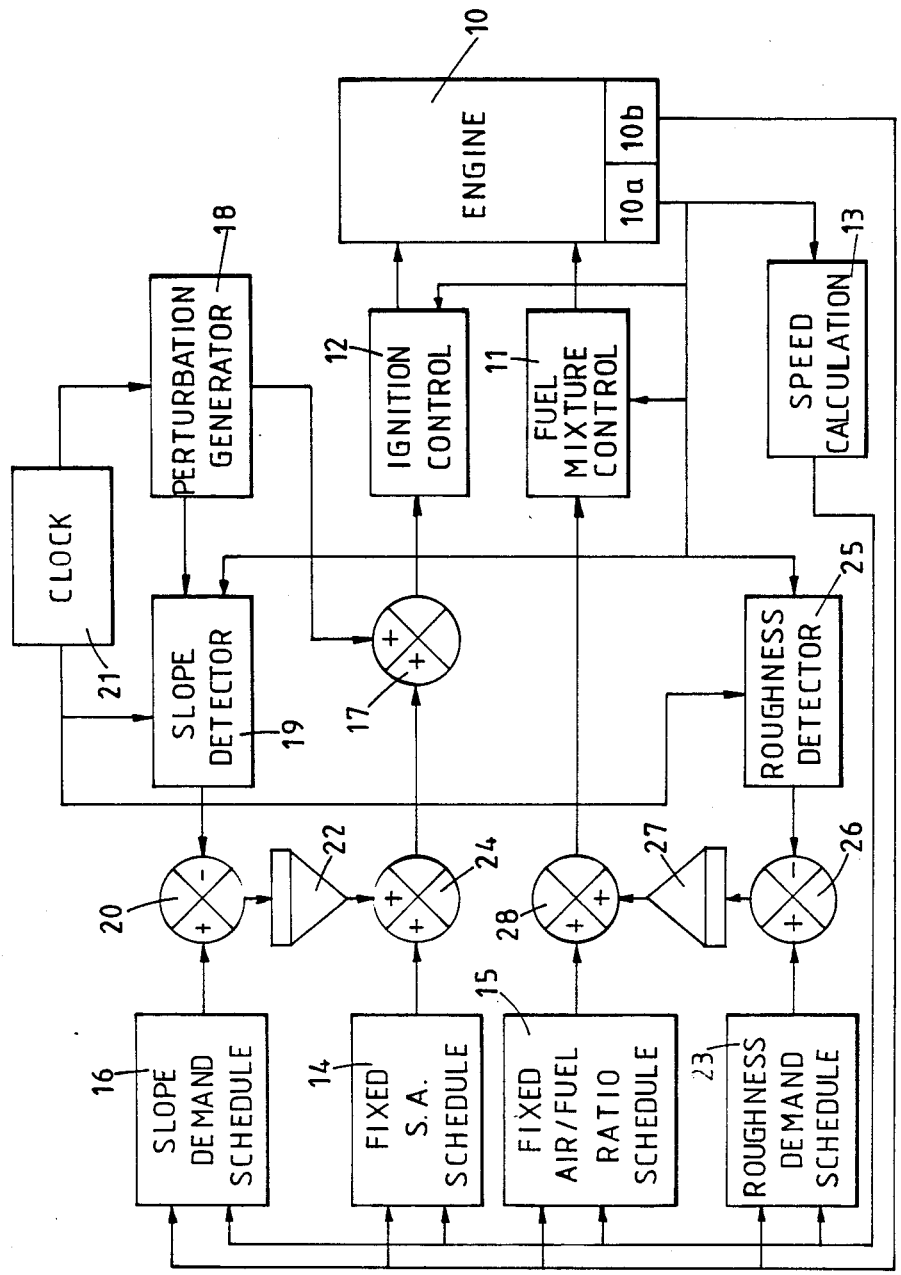
FIG. 1 is a diagram of the functional components of an adaptive control system embodying this invention.

Referring now to FIG. 1, there are shown the functional components of an adaptive control system embodying the principles set out above.

An engine 10 has an electronic fuel control device 11. The device 11 is an electronic fuel injection control device of known type in which a separate injector for each cylinder is arranged to inject fuel into the branch of the air intake manifold leading to that cylinder. Injection is initiated at a specific point in the operating cycle of the engine and the device 11 receives an input which determines the duration of injector opening in each cycle.

The engine 10 has an ignition control device 12 which, in well known manner, causes the individual spark plugs of the engine to be fired at crankshaft angles determined by an input to the device 12.

The engine has a crankshaft position transducer 10a and another transducer 10b which measures air intake manifold pressure as a parameter representing the load demand. The output from the crankshaft position transducer 10a is supplied to both the fuel injection and ignition control devices 11, 12 to enable the fuel injection and ignition operations to be properly synchronised with engine operation. The output of the crankshaft position transducer 10a is also supplied to a speed calculation device 13 which provides a frequently updated output representing the current speed of the crankshaft.

The system includes a set of four memory devices 14, 15, 16 and 23, each of which contains a schedule of values for a particular variable as a function of engine speed and manifold pressure.

The memory 14 contains a schedule of fixed values for the spark advanced angle. The memory 15 contains a schedule of fixed values for the air to fuel ratio.

The memory 16 contains a schedule of values of the slope of engine speed with respect to spark advance angle. For most combinations of engine speed and manifold pressure, the desired value of the slope is zero. But, as explained above, in some operating conditions such as idling, a positive slope is required so as to obtain minimum production of pollutants.

The memory 23 contains a schedule of roughness values. These values are chosen so as to minimise production of pollutants and fuel consumption while maintaining adequate engine smoothness and hence vehicle driveability.

In general, the values stored in the schedules of memories 14, 15, 16 and 23 are selected in accordance with the principles discussed above with reference to FIG. 2. Thus, for each possible combination of engine speed and manifold pressure, the schedules contain a fixed spark advance value, a fixed air to fuel ratio value, a demand value for the slope of engine speed with respect to spark advance angle, and a demand value for engine roughness.

The outputs from the speed calculation circuit 13 and the manifold pressure transducer 10b are supplied to the memory devices 14, 15, 16 and 23 and, for the prevailing speed and load demand, appropriate values are read out from these memory devices. As will be explained below, as the values are stored for discrete values of engine speed and manifold pressure, the operation of reading values out from these memories involves interpolation.

The spark advance angle provided by memory 14 is supplied to an input of a summer 24, the output of which is supplied to an input of a summer 17. The output of summer 17 is supplied to the input of ignition control device 12.

The other input of summer 17 receives an output from a perturbation generator 18. The perturbation generator receives an input from a clock 21. For a fixed number of engine fires, in the present example 12 fires, the output of perturbation generator 18 has positive and negative values in a manner that will be described. These positive and negative values correspond to a particular variation of the spark advance angle, and in the present example this variation is 3°. Thus, the output of the perturbation generator 18 causes the spark advance angle to be alternately increased and decreased during the 12 engine fires. Each series of 12 engine fires in which the spark advance angle is perturbed is followed by an interval of 12 engine fires in which the output of perturbation generator 18 has a zero value. As will be explained, this interval provides an opportunity to calculate the engine roughness.

The output from perturbation generator 18, and also the outputs from crankshaft position transducer 10a and clock 21, are supplied to the input of a slope detector 19. This detector monitors the effect of the perturbation in the spark advance angle on engine speed and produces an output which corresponds to the actually detected value of the slope of engine speed with respect to spark advance angle. This signal is supplied to an error detector 20 which compares the actual value of the slope with a demand value of the slope derived from the schedule in memory device 16. The output of error detector 20 represents the error between these two values and this error varies in both magnitude and sign in accordance with the relationship between the demand and actual values of the slope. The error is supplied to the input of a controller 22. Controller 22 has an integral transfer function and its output is supplied to another input of summer 24. The summer 24 adds the output from controller 22 to the spark advance angle supplied by memory device 14 and thus the output of summer 24 represents a corrected spark advance angle. Thus, the output of summer 17 represents the corrected spark advance angle with the perturbation supplied by perturbation generator 18 superimposed thereon.

The system includes a roughness detector 25 which receives the outputs from crankshaft position transducer 10a and clock 21. During the interval in which no perturbations are applied to the spark advance angle, the roughness detector 25 examines variations in the period of whole engine operating cycles and uses these to calculate the engine roughness. The output from roughness detector 25 is supplied to the negative input of an error detector 26, the positive input of which receives the roughness demand value supplied by memory device 23. Thus, the output of error detector 26 represents the error between the demand and actual values of engine roughness. This error varies in both magnitude and sign. The output from error detector 26 is supplied to the input of a controller 27, which has an integral transfer function The output of controller 27 is supplied to one input of a summer 28, the other input of which receives the value for the air to fuel ratio supplied by memory device 15. Thus, the output of summer 28 represents a corrected value for the air to fuel ratio. This corrected value is supplied to the mixture control device 11.

It will be appreciated that controllers 22 and 27 are acting independently on the spark advance angle and air to fuel ratio control loops. When the engine is running, the engine roughness is monitored. If this does not coincide with the demand value, then the air to fuel ratio is adjusted accordingly. This will change the spark advance angle which corresponds to the demand value of the slope and the spark advance angle control loop will adjust the spark advance angle so as to achieve this demand value.

For example, referring again to FIG. 2, for a particular combination of engine operating conditions, the selected value for the spark advance angle and air to fuel ratio may correspond to point Y. However, owing to differences between the particular engine under consideration and the engine which was used to derive the selected values, this may result in unacceptable roughness. The roughness detector will detect this and the air to fuel ratio control loop will respond so as to produce an air to fuel ratio indicated at point X. The spark advance angle will now be too large resulting in a drop in fuel economy and excessive emission of nitrogen oxides. The slope detector will detect that the spark advance angle is too large and will reduce this until point Z is reached. Thus, despite differences between engines, the engine will operate with a combination of spark advance angle and air to fuel ratio which results in good driveability, low production of pollutants, and optimum engine output.

In the example described above, the controllers 22 and 27 act independently. In order to improve the stability of the control system, cross-compensation can be added between the two control loops.

Figure 4:
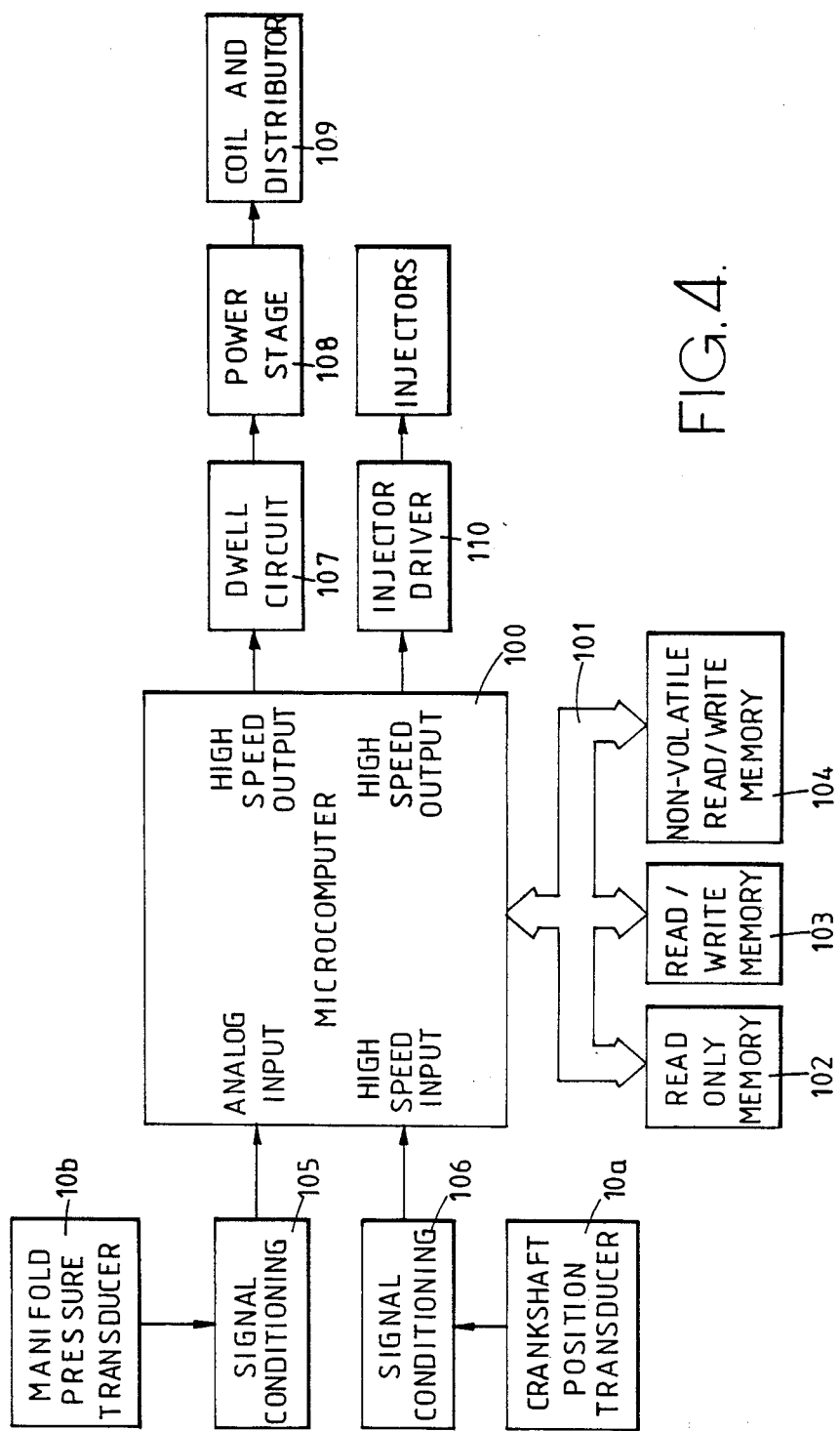
FIG. 4 is a block diagram of a microcomputer system which implements the functional components of FIG. 1.

The various functional blocks shown in FIG. 1 are implemented using a microcomputer system and this system is shown in FIG. 4.

As shown in FIG. 4, the microcomputer system comprises an Intel Corporation 8097 microcomputer 100 which is connected via a data and address bus 101 to a type 27C64 read-only-memory 102, a Hitachi type 6116 read/write memory 103, and a Greenwich Instruments Limited type NVR2 non-volatile read/write memory 104. The programme and fixed schedules are stored in memory 102, temporary variables are stored in memory 103, and corrections for the spark advance angle and air to fuel ratio are stored in memory 104.

The microcomputer system implements the speed calculation device 13, the memory devices 14, 15, 16 and 23, the perturbation generator 18, the slope detector 19, clock 21, roughness detector 25, summers 17, 24 and 28, error detectors 20 and 26, controllers 22 and 27, and parts of the ignition control device 12 and the fuel mixture control device 11.

The manifold pressure transducer 10b is connected through a conventional signal conditioning circuit 105 to an ANALOG input of microcomputer 100. The crankshaft position transducer 10a is of the variable reluctance type and coacts with a toothed wheel mounted on the engine crankshaft and from which teeth have been removed to establish reference positions. The output of transducer 10a is connected through a signal conditioning circuit 106, which operates mainly to filter out noise and provide clean square pulses to a HIGH SPEED input of microcomputer 100. A HIGH SPEED output of the microcomputer is connected to the input of a dwell control circuit 107. The dwell control circuit 107 together with one of the programme modules stored in memory 102 perform the function of the ignition control device 12 of FIG. 1. The dwell control circuit 107 is a type L497 dwell control circuit supplied by S.G.S. Limited. The dwell control circuit 107 initiates a build up of current in the primary winding of the ignition coil at the correct moment to achieve the required level just before the current is interrupted. The dwell control circuit 107 also limits the coil current to the required level during the short period which elapses between achieving the required current and the current being interrupted. The output of dwell control circuit 107 is connected through a power stage 108 to a coil and distributor 109.

Another HIGH SPEED output of microcomputer 100 is connected to the input of an injector driver circuit 110. The injector driver circuit 110 together with part of the programme stored in memory 102 perform the function of the fuel mixture control device 11 FIG. 1. The output of injector driver 110 is supplied to the individual injectors for the combustion chambers of the engine.

Figure 5:
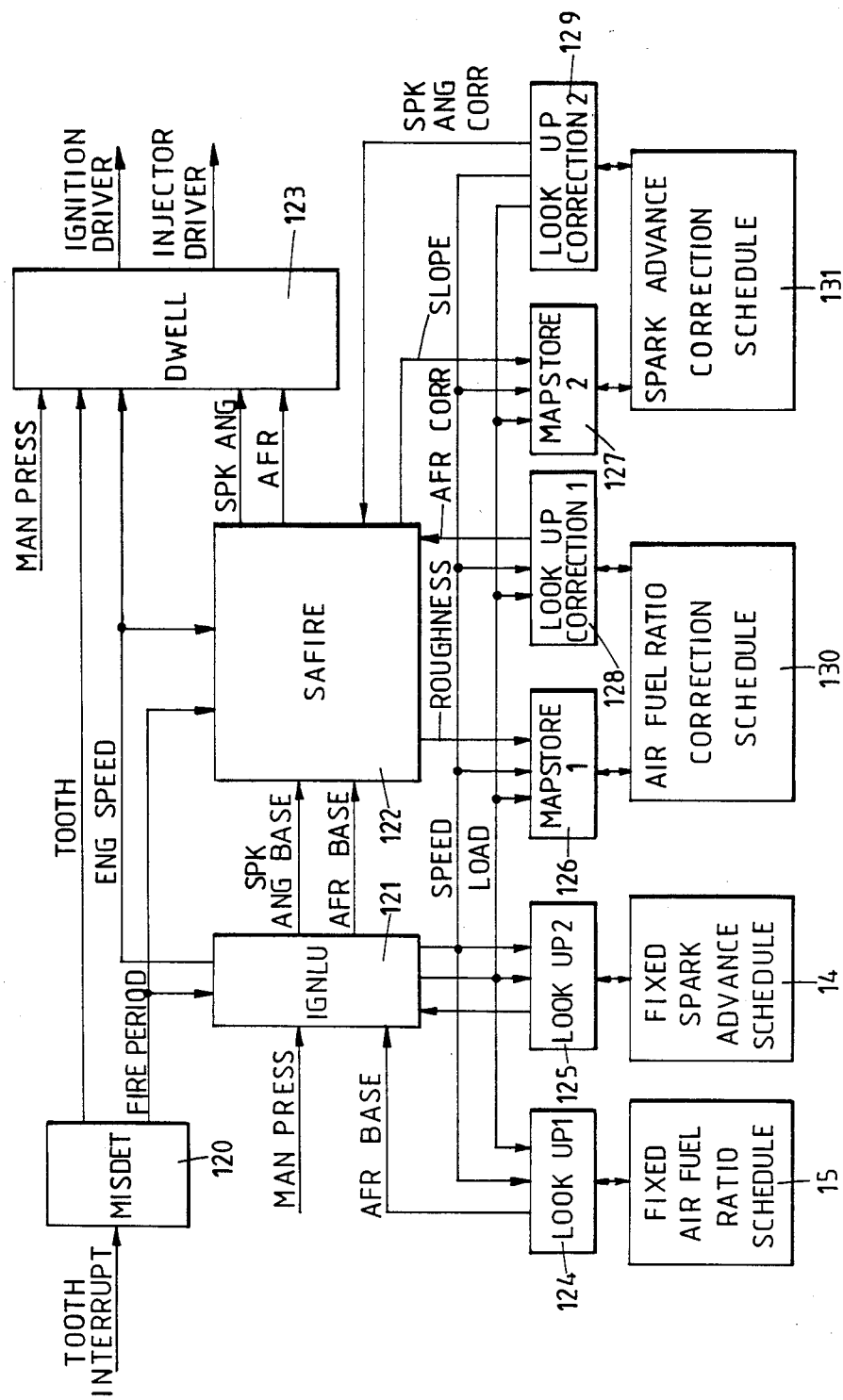
FIG. 5 is a layout diagram of a computer programme for the microcomputer system of FIG. 4.

Referring to FIG. 5, there is shown the general arrangement of the modules which form the programme and also the flow of data between the modules. The programme comprises modules MISDET 120, IGNLU 121, SAFIRE 122, and DWELL 123. The module IGNLU calls sub-modules LOOK UP1 124 and LOOK UP2 125, and the module SAFIRE calls sub-modules MAP STORE1 126, MAPSTORE2 127, LOOK UP CORRECTION1 128 and LOOK UP CORRECTION2 129. FIG. 5 also shows the fixed air to fuel ratio schedule 15 and the fixed spark advance schedule 14, which as noted previously, are stored in the read-only-memory 102. The slope demand schedule 16 and the roughness demand schedule 23 of FIG. 1 are included respectively in the sub-modules MAPSTORE2 and MAPSTORE1. FIG. 5 also shows air to fuel ratio and spark advance angle correction schedules 130 and 131 which contain the corrections for the air to fuel ratio and spark advance angles. As noted previously, these schedules are stored in the non-volatile read/write memory 104. These correction schedules are updated under the control of the sub-modules MAPSTORE1 and MAPSTORE2 in accordance with the errors between the demanded slope and the actual slope and the demanded roughness and the actual roughness. The values stored in the correction schedules 130 and 131 are used to correct the air to fuel ratio and the spark advance angle under the control of sub-modules LOOK UP CORRECTION1 and LOOK UP CORRECTION2. Sub-modules MAPSTORE1, MAPSTORE2, LOOK UP CORRECTION1, and LOOK UP CORRECTION2 together with the correction schedules 130 and 131 perform the function of controllers 22 and 27 in FIG. 1.

The module MISDET receives an interrupt signal TOOTH INTERRUPT and this module is executed each time a tooth is detected. The module MISDET generates a variable TOOTH representing the position of the crankshaft and supplies this variable to the module DWELL. As the teeth on the tooth wheel are positioned at 10° intervals, finer resolution is obtained by interpolation. For each interval, the interpolation is achieved using the time taken for the passage of the previous 10° interval. The module MISDET compares the period between each tooth and thereby detects the missing teeth. When a missing tooth is detected, this module re-establishes the relationship between the variable TOOTH and the absolute position of the crankshaft. The module MISDET also calculates the fire period and supplies this as a variable FIRE PERIOD to the modules IGNLU and SAFIRE. In the present example, ignition occurs each time the crankshaft rotates through approximately 180°. The fire period associated with a particular spark is a period which commences when the crankshaft has rotated through 10° after the piston in the cylinder in which the spark occurs has reached the top dead centre position and ends when the crankshaft has rotated through a further 180°. This period corresponds approximately to the period during which the combustion caused by the spark has the greatest effect on engine speed. It is to be noted that the fire period, when defined in this manner, corresponds to the time taken for the crankshaft to rotate through exactly 180°.

Figure 6:
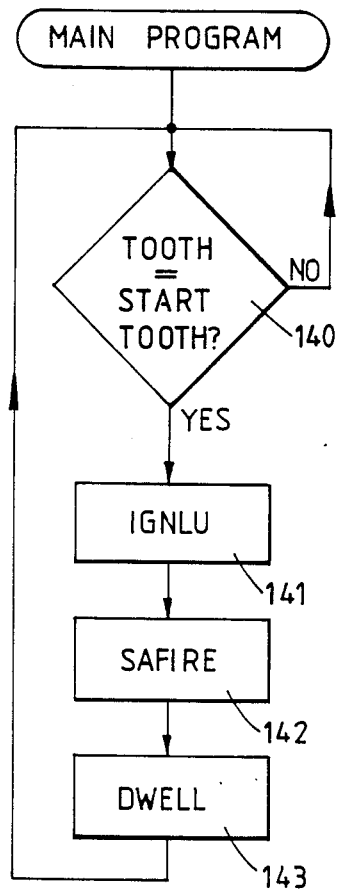
FIG. 6 is a flow chart showing the order of execution of the main modules of the programme.

The modules IGNLU, SAFIRE, and DWELL are executed as part of a main programme, an overall flow chart for which is shown in FIG. 6. As is shown there, in a step 140 the variable TOOTH is compared with a constant START TOOTH. When an equality is found, the sub-modules IGNLU, SAFIRE, DWELL are performed in a series of steps 141, 142 and 143, and the programme then returns to step 140. The constant START TOOTH is chosen so as to permit the steps 141 to 143 to be executed between the occurrence of two adjacent sparks. Thus, the steps of the main programme are executed synchronously with the firing of the engine and always between actual sparks.

The module IGNLU receives a variable MAN PRESS representing manifold pressure and this variable is derived from the output of transducer 10b.

In each of the schedules 14, 15, 130 and 131, the values of air to fuel ratio or spark advance angle are stored as a 16×16 array. In each array, the abscissa and ordinate correspond respectively to engine speed and manifold pressure. Thus, each array point contains a value for the spark advance angle or the air to fuel ratio for a discrete engine speed and a discrete value of the manifold pressure. The values are stored as a 16×16 array as this represents a density for the values which provides a good match for the irregularities of the true optimum characteristics of the spark advance angle and the air to fuel ratio. The sub-modules LOOK UP1, LOOK UP2, LOOK UP CORRECTION1, and LOOK UP CORRECTION2 calculate values for the air to fuel ratio or spark advance angle from the values stored in the associated schedule for the four points in the engine speed/manifold pressure plane surrounding the prevailing engine speed and manifold pressure. Each of these values is multiplied by an appropriate weighting factor and the four resulting values are added to provide an output value.

In order to address the schedules 14, 15, 130 and 131, the module IGNLU generates address variables SPEED and LOAD corresponding respectively to engine speed and manifold pressure. Each of these address variables can assume any one of the values 0 to 15 corresponding to the 16 discrete engine speed and manifold pressure values. These variables are set to the value corresponding to the engine speed and manifold pressure immediately below the prevailing values. As shown in FIG. 5, these address variables SPEED and LOAD are supplied to all of the submodules.

Although not shown in FIG. 5, the module IGNLU also calculates four variables MAP INT 0 to 3 which represent the four weighting factors mentioned above. These four variables MAP INT 0 to 3 correspond respectively to the four addresses (SPEED, LOAD), (SPEED+1,LOAD), (SPEED, LOAD+1), (SPEED+1, LOAD+1).

Figure 7:
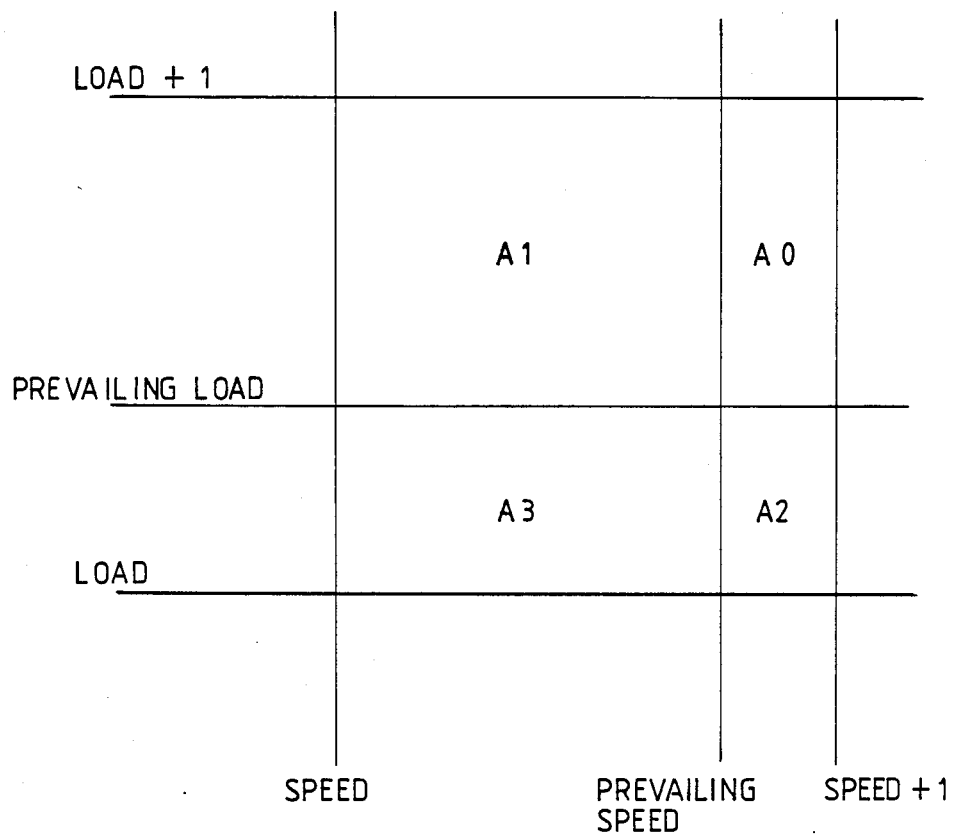
FIG. 7 is a diagram illustrating the calculation of weighting factors used in the programme.

The method of calculating the weighting factors MAP INT 0 to 3 for the prevailing speed and load is shown in FIG. 7. A main rectangle is formed in the speed/load plane, the corners of the rectangle lying at addresses (SPEED, LOAD), (SPEED+1, LOAD), (SPEED, LOAD+1), (SPEED+1, LOAD+1). This main rectangle is divided into four subrectangles by drawing the abscissa and ordinate passing through the prevailing speed and load demand, these subrectangles having areas A0, A1, A2, A3. The weighting factor for each of the four array points is calculated by dividing the area of the sub-rectangle diagonally opposite the array point by the area of the main rectangle. Thus, the weighting factors MAP INT 0 to 3 have the following values:

MAP INT 0=A0/A s

MAP INT 1=A1/A

MAP INT 2=A2/A

MAP INT 3=A3/A where A=A0+A1+A2+A3.

The module IGNLU also calculates engine speed from the variable FIRE PERIOD and supplies this as a variable ENG SPEED to each of the modules SAFIRE and DWELL.

The module IGNLU calls sub-modules LOOK UP1 AND LOOK UP2 which calculate, respectively, basic values for the air to fuel ratio and spark advance angle by the interpolation process described above and supplies these values as variable AFR BASE and SPK ANG BASE to the module SAFIRE.

The module SAFIRE determines the perturbation to the spark advance angle and, using the variable FIRE PERIOD, calculates variables SLOPE and ROUGHNESS representing respectively the slope of engine speed with respect to spark advance angle and engine roughness. This module calls the sub-routines MAPSTORE1 and MAPSTORE2 which respectively use the variable ROUGHNESS and SLOPE to update the air to fuel ratio correction schedule 130 and the spark advance correction schedule 131. This module also calls the sub-modules LOOK UP CORRECTION1 and LOOK UP CORRECTION2 which calculate variables AFR CORR and SPK ANG CORR representing the correction values for the air to fuel ratio and the spark advance angle. This module sums the variables SPK ANG BASE and SPK ANG CORR and the value for the perturbation to produce a variable SPK ANG representing a command value for the spark advance angle and this is supplied to the module DWELL. Similarly, this module sums the variables AFR BASE and AFR CORR to provide a variable AFR representing a command value for the air to fuel ratio and this variable is supplied to the module DWELL.

Figure 8:
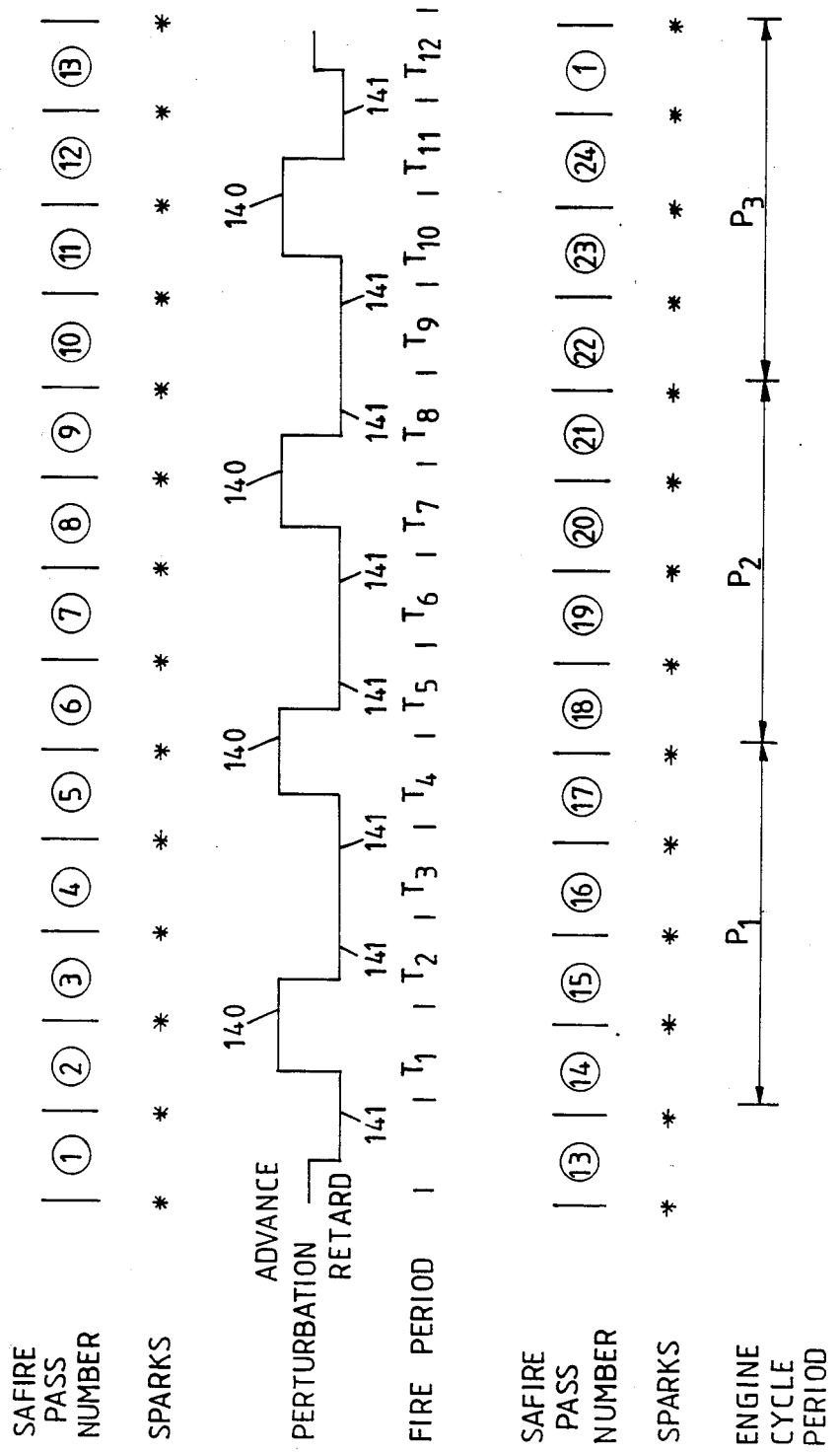
FIG. 8 is a diagram used for explaining the operation of the module SAFIRE.
Figure 9A:
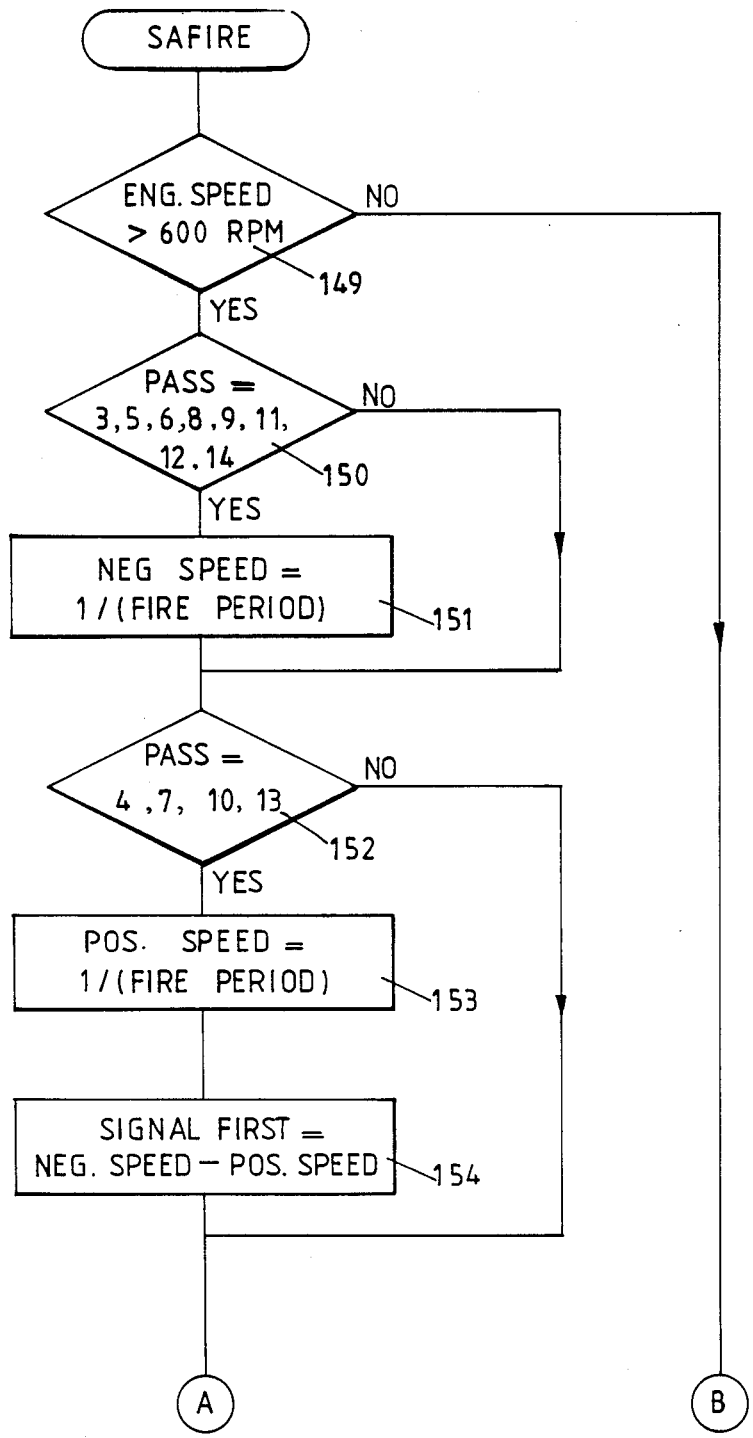
Figure 9B:
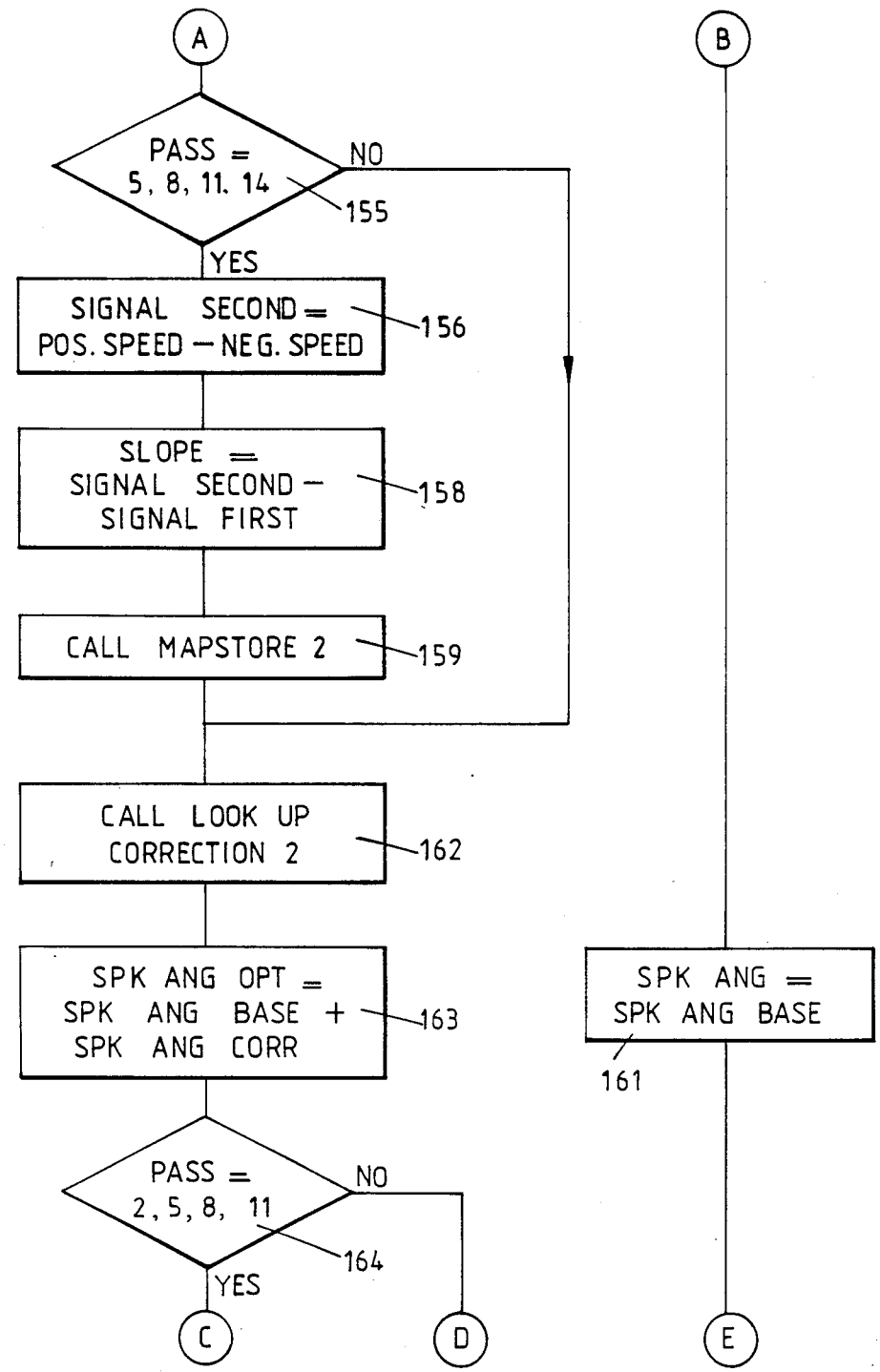
Figure 9C:
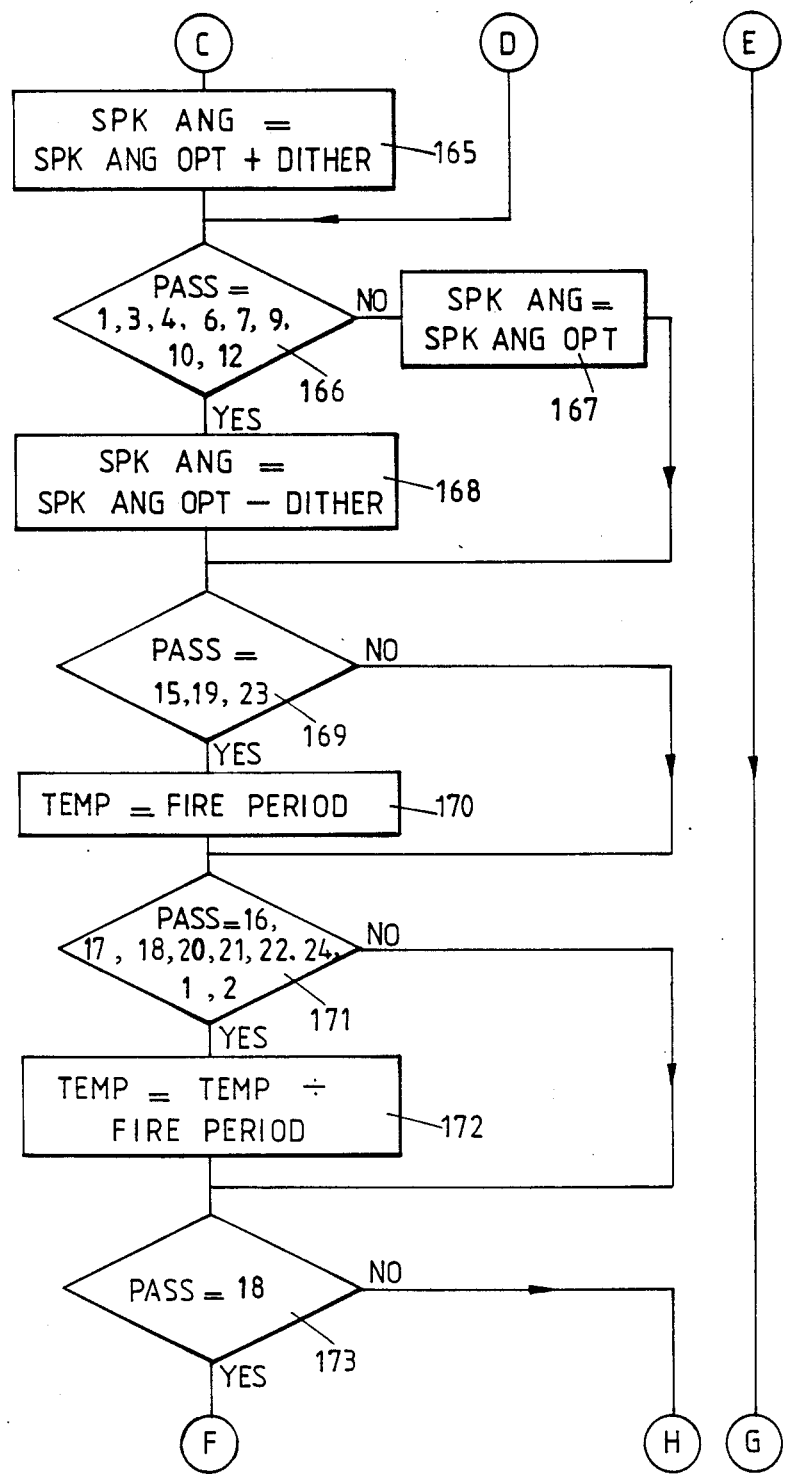
Figure 9D:
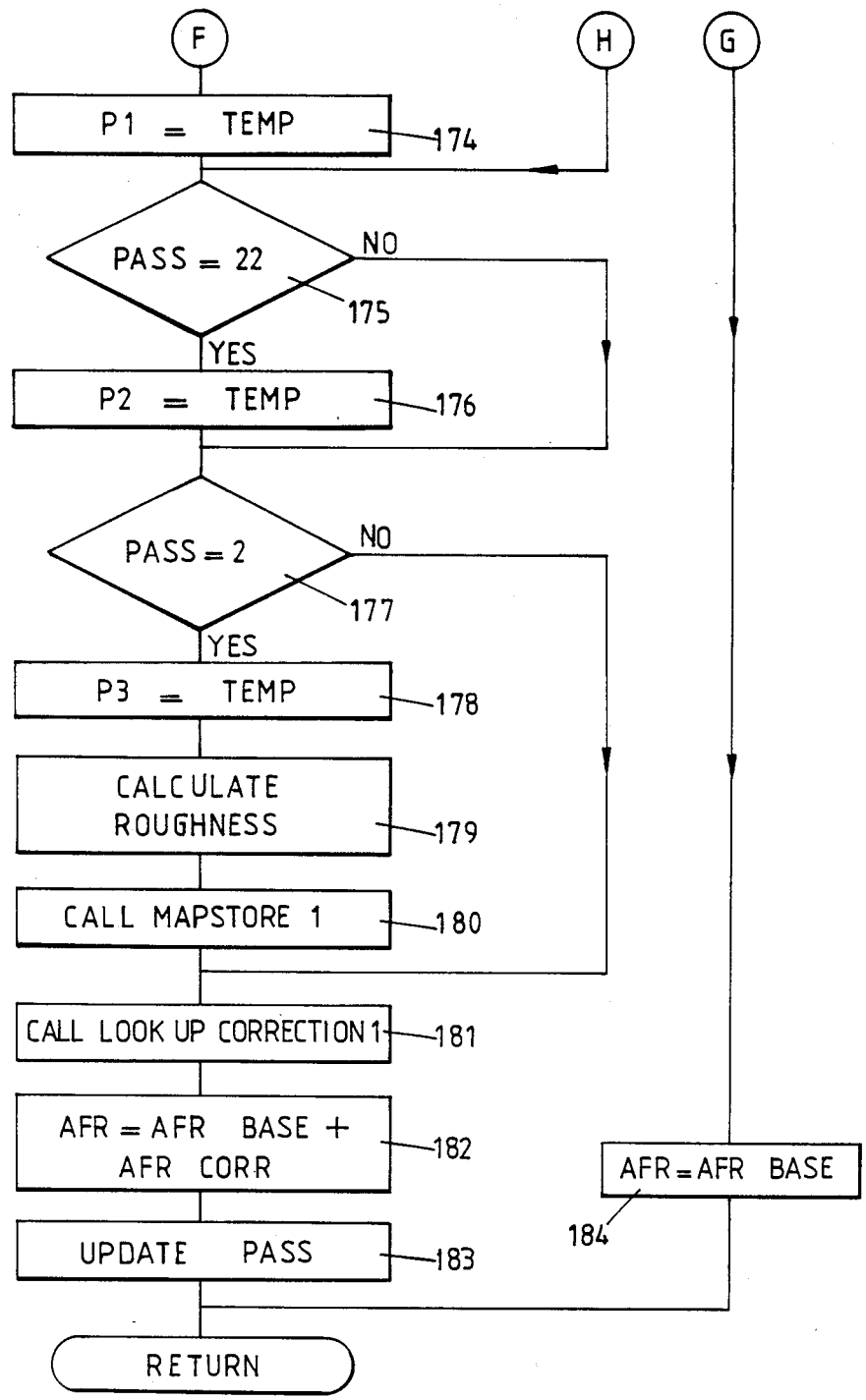

As mentioned previously, positive and negative perturbations are applied to the spark advance angle for twelve successive engine fire periods and there is then an interval of a further twelve fire periods in which no perturbation is applied. Thus, as there is one pass through the module SAFIRE for each fire period, the complete operating cycle of th module SAFIRE comprises twenty-four successive passes. The general arrangement of a complete operating cycle of this module is shown in FIG. 8. In FIG. 8, the twenty-four successive passes are indicated by numbers placed in circles and associated ignition sparks are marked by asterisks. The positive and negative perturbations generated in the first twelve passes are shown by a waveform in which the positive perturbations are indicated by reference numeral 140 and the negative perturbations by reference numeral 141.

The negative perturbation generated during pass 1 will be applied to the ignition spark which occurs between pass 1 and pass 2. This perturbation will affect the fire period which commences after this ignition spark and the value of this fire period will be available during pass 3. In FIG. 8, the fire periods corresponding to the perturbations generated in passes 1 to 12 are indicated by $T_1$ to $T_{12}$. These twelve fire periods are used, in a manner that will be explained, for calculating the slope. As mentioned above, no perturbation is generated in passes 13 and 24. As the engine is a four-cylinder engine, these twelve passes are associated with three complete engine operating cycles and the periods of these cycles are marked on FIG. 8 as P1, P2, P3. These three periods are used to calculate the engine roughness.

The flow chart for the module SAFIRE is shown in FIG. 9 and will now be described.

In step 149, the variable ENG SPEED representing engine speed is examined. At engine speeds below 600 RPM, satisfactory measurement of the slope is not possible. Thus, if ENG SPEED is less than 600 RPM, in a step 161, the variable SPK ANG is set to SPK ANG BASE and AFR is set to AFR BASE in step 184. If the engine speed is greater than 600 RPM, the program continues with a step 150.

In a set of steps 150 to 158, the variable SLOPE is calculated. Specifically, in a step 150, a variable PASS, representing the present pass number of the module, is examined. If this variable has a value of 3, 5, 6, 8, 9, 11, 12, 14, in a step 151 a variable NEG SPEED is calculated as the reciprocal of the variable FIRE PERIOD. The variable NEG SPEED represents the engine speed corresponding to a negative perturbation.

In step 152, the variable PASS is examined again. If it has a value of 4, 7, 10, 13, a variable POS SPEED is calculated as the reciprocal of FIRE PERIOD. POS SPEED represents the engine speed corresponding to a positive perturbation. Then, in a step 154, a variable SIGNAL FIRST is calculated as the difference between NEG SPEED and POS SPEED. The variable SIGNAL FIRST represents the change in engine speed caused by the transition from a negative to a positive perturbation.

In a step 155, the variable PASS is examined once again. If it has a value of 5, 8, 11, 14, in a step of 156, a variable SIGNAL SECOND is calculated as the difference between POS SPEED and NEG SPEED. Thus, SIGNAL SECOND represents the change in engine speed caused by the transition from a positive to a negative perturbation.

In pass numbers 5, 8, 11, 14 there is sufficient information available to calculate the slope. In step 158, SLOPE is calculated as the difference between SIGNAL SECOND and SIGNAL FIRST. By evaluating the slope in this manner, changes in engine speed which are caused by rapid linear acceleration or deceleration of the engine are eliminated.

The module continues with a step 159 in which the sub-module MAPSTORE2 is called. This sub-module updates the values stored in correction schedule 131 for each of the four array points surrounding the prevailing engine speed and manifold pressure. For each array point, a new correction is calculated and stored, a new correction being calculated from the old correction in accordance with the following formula:

new correction = old correction +

$$k_1 \times \text{(weighing factor)} \times (\text{SLOPE} - S)$$

This formula corrects the values in schedule 131 by integration and smooths out the noise component and the slope measurements. The constant $k_1$ should be chosen so as to be small enough to reduce these noise components to a low level but large enough to provide rapid convergence to the optimum advance angle. The weighting factor given in this formula is the appropriate one of the weighting factors MAP INT 0 to MAP INT 3 described above. S is the demanded value of the slope for the prevailing engine speed and manifold pressure.

In a set of steps 162 to 168, the variable SPK ANG is calculated.

In a step 162, the sub-module LOOK UP CORRECTION 2 is called and a value for SPK ANG CORR is calculated. In step 163, a variable SPK ANG OPT, representing the optimum value for the spark advance angle, is calculated as the sum of SPK ANG BASE and SPK ANG CORR.

In step 164, PASS is examined. If it has a value of 2, 5, 8, 11, in a step 165, SPK ANG is calculated as the sum of SPK ANG OPT and DITHER. In a step 166, PASS is examined again. If it has a value of 1, 3, 4, 6, 7, 9, 10, 12, in a step 168 SPK ANG is calculated as the difference between SPK ANG OPT and DITHER. DITHER corresponds to the magnitude of the perturbation and so has a value corresponding to 3° of spark advance angle. Thus, in steps 165 and 168, the positive and negative perturbations are applied to the spark advance angle.

If PASS has a value 13 to 24, in a step 167, SPK ANG is set to SPK ANG OPT.

In steps 169 to 179, the engine roughness is calculated. As mentioned above, the engine roughness is calculated from the periods of three complete engine cycles during which no perturbation is applied to the spark advance angle. In step 169, the variable PASS is examined. The fire period corresponding to the beginning of each of these three engine cycles is available in passes 15, 19 and 23. If PASS has a value of 15, 19 or 23, in step 170, a variable TEMP is set to the present value of FIRE PERIOD.

In step 171, PASS is examined. If it has a value of 16, 17, 18, 20, 21, 22, 24, 1 or 2, in a step 172 the variable TEMP is incremented by the present value of FIRE PERIOD. Thus, following step 172, in passes 18, 22, and 2, the variable TEMP will have a value corresponding to the first, second or third complete engine fire period.

In steps 173, 175 and 177 PASS is examined. If it has a value of 18, 22, or 2, in step 174, 176 or 178, a variable P1, P2 or P3 is set to the present value of TEMP. The variables P1, P2, P3 correspond respectively to the first, second and third complete engine cycle periods.

In step 179, the variable ROUGHNESS is calculated in accordance with the following formula: ROUGHNESS=$(P1-2P2+P3)/(P1+P2+P3)^3$.

This formula is discussed in a paper entitled "Experience with a new method of measuring engine roughness" by R. Latsch et al, ISAT Graz Automotive Automation, London 1978, and also in U.S. Pat. No. 4,178,891.

Next, in a step 180, the sub-module MAPSTORE1 is called and this module updates the values stored in correction schedule 130 for each of the four array points surrounding the prevailing engine speed and manifold pressure. For each array point, a new correction is calculated and stored, a new correction being calculated from the old correction in accordance with the following formula:

new correction = old correction +

$$k_2 \times \text{(weighing factor)} \times (\text{ROUGHNESS} - R).$$

$k_2$ should be chosen so as to be small enough to reduce noise components to a low level but large enough to provide rapid convergence to the optimum air to fuel ratio. The weighting factor given in this formula is the appropriate one of the weighting factors MAP INT 0 to MAP INT 3 described above. R is the demand value of engine roughness for the prevailing engine speed and manifold pressure.

In step 181, the sub-module LOOK UP CORRECTION1 is called and calculates a value for AFR CORR. Then, in a step 182, AFR is calculated as the sum of AFR BASE and AFR CORR.

Finally, in a step 183, the variable PASS is updated.

The module DWELL uses the variables TOOTH, ENG SPEED, SPK ANG, and AFR to cause the microcomputer 100 to provide appropriate signals to the dwell circuit 107 and the injector drive circuit 110 to cause ignition sparks and fuel injection to occur at appropriate crankshaft positions with the air to fuel ratio set at the commanded value.

The module DWELL also uses inputs MAN PRESS and ENG SPEED to calculate air flow in order to calculate an injector pulse duration to give the commanded AFR.

Although in the above example, the air to fuel ratio is controlled with a set of injectors, the present invention may be applied to an engine in which the air to fuel ratio is controlled with an electronically trimmed carburettor or with a single point injector. With such a carburettor or a single point injector, the engine will respond more slowly to changes in fuelling due to transport effects in the inlet manifold. In order to allow for this delay, a relatively low value should be used for the constant $k_2$ that is used in the formula for calculating the corrections to the air to fuel ratio correction schedule 130.

The above example has been described with reference to a conventional mixture control device in which the control device alters the rate of fuel flow while the rate of air flow or the rate of mixture flow is controlled by the driver of the vehicle in which the engine is installed. However, the invention may also be applied to an unconventional system in which the mixture control device alters the rate of air flow and the fuel flow is directly controlled by the drive.

The present invention may also be used in a petrol or a compression ignition (diesel) engine in which exhaust gas is recirculated to the combustion chambers. With such an engine, instead of controlling the air to fuel ratio, the present invention may be used to control the exhaust gas recirculation ratio.

Although in the example described above, engine roughness is used as a parameter to control the mixture composition, other parameters indicative of combustion performances may be used instead. Such parameters include parameters indicative of the intensity or colour of the flames occurring in the combustion chambers or variations in the pressure occurring in the combustion chambers.

Although the above example describes applying perturbations to the spark advance angle in a spark ignition engine in order to compensate the spark advance angle for variations in the air to fuel ratio, the present invention is not limited to this application For example, it can also be used to apply perturbations to the timing of fuel injection in compression ignition engines so as to provide corrections to this parameter.

In the above example, the spark advance angle is compensated for variations in the air to fuel ratio by applying perturbations to the spark advance angle and then calculating the slope of engine output with respect to spark advance angle and using this to calculate the corrections. However, the present invention is not limited to this particular method of calculating the corrections. For example, the corrections to the spark advance angle could be calculated by determining the difference between the actual value of the air to fuel ratio and the value obtained from the fixed air to fuel ratio schedule 15 and then using this difference to calculate an appropriate correction to the spark advance angle.

In the above example, the corrections to the air to fuel ratio and the spark advance angle are applied uniformly to all the engine cylinders. By way of modification, the corrections could be calculated for each individual cylinder to take account of variations between the individual cylinders.

In the example described above, there are provided the fixed and correction spark advance schedules 14 and 131 and also the fixed and correction air to fuel ratio schedules 15 and 130. By way of modification, there may be provided a single spark advance schedule and a single air to fuel ratio schedule. The schedules would initially be provided with fixed values and these values would then be updated in accordance with the slope and roughness measurements.

I claim:

1. An adaptive control system for an internal combustion engine having a combustion performance indicating parameter with a desired value, said system comprising a mixture composition control device having a first control input, an ignition timing control device having a second control input, measuring means for measuring the combustion performance indicating parameter, variation applying means for applying a variation to said first control input so as to achieve the desired value of the combustion performance indicating parameter, and compensating means for compensating said second control input for the variation applied to said first control input.

2. A system as claimed in claim 1, further comprising means for establishing the desired value of the combustion performance indicating parameter in accordance with operating conditions of the engine.

3. A system as claimed in claim 2, further comprising means for establishing a first base value for said first control input in accordance with the engine operating conditions and means for establishing a second base value for said second control input in accordance with the engine operating conditions, said variation applying means being arranged to apply the variation with respect to the first base value and said compensating means being arranged to compensate said second control input with respect to the second base value.

4. A system as claimed in claim 1, in which said measuring means is arranged to measure engine roughness as the combustion performance indicating parameter.

5. A system as claimed in claim 1, in which said mixture composition control device comprises a device for controlling an air to fuel ratio of a mixture supplied to the engine.

6. A system as claimed in claim 1, in which said mixture composition control device comprises a device for controlling a ratio of exhaust gas to air in a mixture of air and fuel supplied to the engine.

7. A system as claimed in claim 1, in which said compensating means comprises means for determining a slope of a parameter indicative of engine output with respect to ignition timing and means for varying said second control input so as to achieve a desired value of the slope.

8. A system as claimed in claim 7, further comprising means for establishing the desired value in accordance with engine operating conditions.

9. A system as claimed in claim 8, in which said slope determining means is arranged to apply a perturbation to said second control input and to determine the slope from a resulting variation in the engine output parameter.

10. A system as claimed in claim 1 for a spark-ignition engine, in which said ignition timing control device is a device for controlling spark advance angle.

11. A system as claimed in claim 1 for a compression-ignition engine, in which said ignition timing control device is a device for controlling timing of fuel injection.

12. A method of controlling an internal combustion engine, having a mixture control device having a first control input and an ignition control device having a second control input, said method comprising the steps of measuring a parameter indicative of combustion performance of the engine, applying a variation to the first control input so as to achieve a desired value of the combustion performance parameter, and compensating the second control input for the variation applied to the first control input.

13. A method as claimed in claim 12, further comprising establishing the desired value of the combustion performance parameter in accordance with operating conditions of the engine.

14. A method as claimed in claim 12, further comprising establishing first and second base values for the first and second control inputs in accordance with engine operating conditions, varying the first control input with respect to the first base value, and compensating the second control input with respect to the second base value.

15. A method as claimed in claim 12, further comprising measuring roughness as the engine performance parameter.

16. A method as claimed in claim 12, in which said compensating step comprises determining the slope of a parameter indicative of engine output with respect to ignition timing and varying the second control input so as to achieve a desired value of the slope.

17. A method as claimed in claim 16, further comprising establishing the desired value in accordance with engine operating conditions.

18. A method as claimed in claim 16, in which the slope is determined by applying a perturbation to the second control input and determining the slope from a resulting variation in the engine output parameter.

19. A method as claimed in claim 13, in which the engine operating conditions are load demand to which the engine is subjected and engine speed.

20. A method as claimed in claim 14, in which the engine operating conditions are load demand to which the engine is subjected and engine speed.

21. A method as claimed in claim 17, in which the engine operating conditions are load demand to which the engine is subjected and engine speed.

* * * * *